(12) United States Patent
Lu et al.

(10) Patent No.: US 12,506,398 B2
(45) Date of Patent: Dec. 23, 2025

(54) BUCK CONVERTER USING ULTRA-LOW WORKING CURRENT

(71) Applicant: ANPEC ELECTRONICS CORPORATION, Hsinchu (TW)

(72) Inventors: Yi-Chuan Lu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 309 days.

(21) Appl. No.: 18/113,134

(22) Filed: Feb. 23, 2023

(65) Prior Publication Data

US 2024/0171075 A1    May 23, 2024

(30) Foreign Application Priority Data

Nov. 23, 2022  (TW) .................................. 111144710

(51) Int. Cl.
*H02M 1/00*    (2007.01)
*H02M 3/158*   (2006.01)

(52) U.S. Cl.
CPC ......... *H02M 1/0032* (2021.05); *H02M 3/158* (2013.01); *H02M 1/0025* (2021.05)

(58) Field of Classification Search
CPC .... H02M 1/0035; H02M 1/0032; H02M 1/36; H02M 1/0025; H02M 1/0041; H02M 1/08
See application file for complete search history.

(56) References Cited

U.S. PATENT DOCUMENTS

| | | | | |
|---|---|---|---|---|
| 6,127,815 A | * | 10/2000 | Wilcox | H02M 3/156 323/351 |
| 9,250,638 B1 | * | 2/2016 | Guan | G05F 1/10 |
| 10,686,381 B1 | * | 6/2020 | Zhang | H02M 3/1588 |
| 2007/0236188 A1 | * | 10/2007 | Gibson | H02M 3/1563 323/225 |
| 2011/0115456 A1 | * | 5/2011 | Tanifuji | H02M 3/156 323/283 |
| 2015/0042303 A1 | * | 2/2015 | Yang | H02M 3/156 323/282 |
| 2015/0123638 A1 | * | 5/2015 | Thiele | H02M 3/156 323/293 |
| 2019/0245440 A1 | * | 8/2019 | Hallikainen | H02M 3/156 |
| 2022/0231611 A1 | * | 7/2022 | Blanco | H02M 1/0041 |

* cited by examiner

*Primary Examiner* — Gustavo A Rosario-Benitez
(74) *Attorney, Agent, or Firm* — Li & Cai Intellectual Property (USA) Office

(57) ABSTRACT

A buck converter using an ultra-low working current is provided. An error amplifier amplifies a difference between a voltage of an output terminal of the buck converter and a reference voltage to output an error amplified signal. A comparator compares a voltage of the error amplified signal with a ramp voltage to output a comparison signal. A control circuit controls a driver circuit to drive a high-side switch and a low-side switch according to the comparison signal. When the buck converter does not enter an ultra-low current mode, a low current controller circuit controls a system circuit to obtain an input current from an input power source. When the buck converter enters the ultra-low current mode, the low current controller circuit controls the system circuit to stop obtaining the input current from the input power source.

19 Claims, 7 Drawing Sheets

BUCK CONVERTER USING ULTRA-LOW WORKING CURRENT

CROSS-REFERENCE TO RELATED PATENT APPLICATION

This application claims the benefit of priority to Taiwan Patent Application No. 111144710, filed on Nov. 23, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a buck converter, and more particularly to a buck converter using an ultra-low working current.

BACKGROUND OF THE DISCLOSURE

Power converters are indispensable devices for electronic devices. The power converters are used to adjust power and supply the adjusted power to the electronic devices. The power converters include boost converters and buck converters. If only ultra-low power is required for the electronic devices, the buck converters only need to supply ultra-low output currents to the electronic devices, such that the electronic devices can obtain sufficient power without causing unnecessary power consumption of the buck converters.

However, if ultra-low output currents are to be supplied to the electronic devices, the buck converters must only obtain ultra-low input currents from external input power sources as working currents of circuit components of the buck converters to allow the ultra-low output currents to be supplied to the electronic devices via the buck converters.

SUMMARY OF THE DISCLOSURE

In response to the above-referenced technical inadequacies, the present disclosure provides a buck converter using an ultra-low working current. The buck converter includes a high-side switch, a low-side switch, an error amplifier, a comparator, a control circuit, a driver circuit and a low current controller circuit. A first terminal of the high-side switch is connected to an input power source and obtains an input current from the input power source. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of a capacitor. A second terminal of the capacitor is grounded. A first input terminal of the error amplifier is connected to a node between the second terminal of the inductor and the first terminal of the capacitor. A second input terminal of the error amplifier is coupled to a reference voltage. A first input terminal of the comparator is coupled to a ramp voltage. A second input terminal of the comparator is connected to an output terminal of the error amplifier. A first power terminal of the comparator is connected to the input power source. When the buck converter does not enter an ultra-low current mode, the first power terminal of the comparator obtains an input current from the input power source. The control circuit is connected to an output terminal of the comparator. The control circuit is configured to output a control signal according to a comparison signal outputted by the comparator. The driver circuit is connected to an output terminal of the control circuit, a control terminal of the high-side switch, and a control terminal of the low-side switch. The driver circuit is configured to drive the high-side switch and the low-side switch according to the control signal. The low current controller circuit is connected to the output terminal of the error amplifier and a control terminal of the comparator. The low current controller circuit is configured to output a current mode controlling signal to the control terminal of the comparator according to an error amplified signal outputted by the error amplifier. When the buck converter enters the ultra-low current mode, the comparator stops obtaining the input current from the input power source or reduces the input current obtained from the input power source according to the current mode controlling signal from the low current controller circuit.

In certain embodiments, a first power terminal of the error amplifier is connected to the input power source. When the buck converter does not enter the ultra-low current mode, the first power terminal of the error amplifier obtains an input current from the input power source.

In certain embodiments, the buck converter further includes a voltage divider. The voltage divider circuit includes a first resistor and a second resistor. A first terminal of the first resistor is connected to the node between the second terminal of the inductor and the first terminal of the capacitor. A first terminal of the second resistor is connected to a second terminal of the first resistor and the first input terminal of the error amplifier. A second terminal of the second resistor is grounded.

In certain embodiments, the low current controller circuit includes a buffer and a logic circuit. An input terminal of the buffer is connected to the output terminal of the error amplifier. A first input terminal of the logic circuit is connected to an output terminal of the buffer. A second input terminal of the logic circuit receives a rest signal. An output terminal of the logic circuit is connected to the control terminal of the comparator. The logic circuit outputs the current mode controlling signal according to the error amplified signal and the rest signal.

In certain embodiments, the low current controller circuit is connected to a working voltage supplying circuit. When the working voltage supplying circuit determines that the buck converter enters the ultra-low current mode according to the current mode controlling signal from the low current controller circuit, the working voltage supplying circuit does not supply the reference voltage to the second input terminal of the error amplifier.

In certain embodiments, when the working voltage supplying determines that the buck converter enters the ultra-low current mode according to the current mode controlling signal, the working voltage supplying circuit does not supply a bias voltage to a second power terminal of the comparator.

In certain embodiments, when the working voltage supplying determines that the buck converter enters the ultra-low current mode according to the current mode controlling signal, the working voltage supplying circuit does not supply a bias voltage to a second power terminal of the error amplifier.

In certain embodiments, the low current controller circuit is connected to a current mode determining circuit. The current mode determining circuit outputs a current mode sampling signal according to the current mode controlling signal from the low current controller circuit.

In certain embodiments, the current mode determining circuit includes a counter circuit and a sample and hold circuit. The counter circuit is connected to the low current controller circuit. The counter circuit is configured to count for outputting a count signal according to the current mode controlling signal from the low current controller circuit. The sample and hold circuit is connected to the counter circuit. The sample and hold circuit is configured to sample and hold the count signal to output the current mode sampling signal.

In certain embodiments, the current mode determining circuit is connected to a reference voltage circuit. The reference voltage circuit is connected to the second input terminal of the error amplifier and the input power source. When the reference voltage circuit determines that the buck converter does not enter the ultra-low current mode according to the current mode sampling signal, the reference voltage circuit obtains an input current from the input power source and supplies the reference voltage to the second input terminal of the error amplifier.

In certain embodiments, when the reference voltage circuit determines that the buck converter enters the ultra-low current mode according to the current mode sampling signal, the reference voltage circuit does not obtain the input current and does not supply the reference voltage.

In certain embodiments, the reference voltage circuit includes a reference voltage supplying circuit and a reference voltage controlling circuit. The reference voltage supplying circuit is connected to the second input terminal of the error amplifier and the input power source. The reference voltage controlling circuit is connected to the current mode determining circuit and the reference voltage supplying circuit. The reference voltage controlling circuit determines whether or not the buck converter enters the ultra-low current mode according to the current mode sampling signal, and accordingly determines whether the reference voltage controlling circuit controls the reference voltage supplying circuit to obtain the input current from the input power source and to supply the reference voltage to the second input terminal of the error amplifier.

In certain embodiments, the current mode determining circuit is connected to a bias circuit. The bias circuit is connected to the input power source and a second power terminal of the comparator. When the bias circuit determines that the buck converter does not enter the ultra-low current mode according to the current mode sampling signal, the bias circuit obtains an input current from the input power source and supplies a bias voltage to the second input terminal of the comparator. When the bias circuit determines that the buck converter enters the ultra-low current mode according to the current mode sampling signal, the bias circuit does not obtain the input current from the input power source.

In certain embodiments, when the bias circuit determines that the buck converter enters the ultra-low current mode according to the current mode sampling signal, the bias circuit does not supply the bias voltage to the second input terminal of the comparator.

In certain embodiments, the bias circuit is further connected to a second power terminal of the error amplifier. When the bias circuit determines that the buck converter does not enter the ultra-low current mode according to the current mode sampling signal, the bias circuit obtains an input current from the input power source and supplies the bias voltage to the second input terminal of the error amplifier.

In certain embodiments, when the bias circuit determines that the buck converter enters the ultra-low current mode according to the current mode sampling signal, the bias circuit does not supply the bias voltage to the second input terminal of the error amplifier.

In certain embodiments, the buck converter further includes an on-time setting circuit. The on-time setting circuit is connected to the bias circuit. When the bias circuit determines that the buck converter does not enter the ultra-low current mode according to the current mode sampling signal, the bias circuit supplies the bias voltage to the on-time setting circuit.

In certain embodiments, when the bias circuit determines that the buck converter enters the ultra-low current mode according to the current mode sampling signal, the bias circuit does not supply the bias voltage to the on-time setting circuit.

In certain embodiments, the buck converter further includes an on-time setting circuit. The on-time setting circuit is connected to the control circuit, the low current controller circuit and the input power source. When the on-time setting circuit determines that the buck converter does not enter the ultra-low current mode according to the current mode controlling signal from the low current controller circuit, the on-time setting circuit obtains an input current from the input power source and outputs an on-time signal to the control signal. The control circuit outputs the control signal according to both of the on-time signal and the comparison signal.

In certain embodiments, when the on-time setting circuit determines that the buck converter enters the ultra-low current mode according to the current mode controlling signal, the on-time setting circuit does not obtain the input current from the input power source.

As described above, the present disclosure provides the buck converter using the ultra-low working current. When only an ultra-low current is required for a load, some of the circuit components of the buck converter of the present disclosure stop obtaining the input current from the input power source as working current or reduce the input current obtained from the input power source such that the working current of the buck converter of the present disclosure is reduced to an ultra-low value. Therefore, an output current supplied to the load by the buck converter of the present disclosure is effectively reduced to the ultra-low current required for the load, while power consumption of the buck converter of the present disclosure is reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
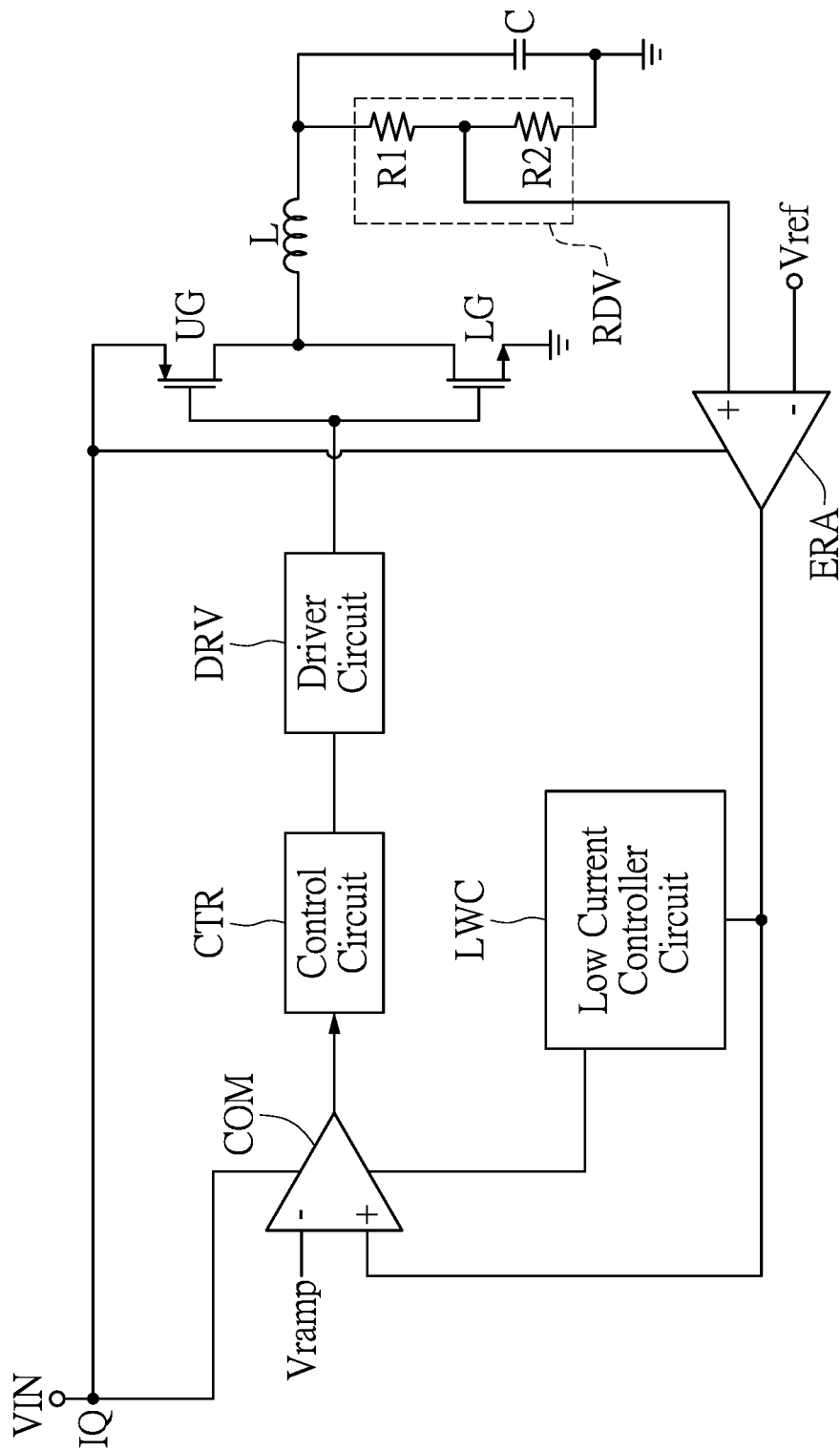
FIG. 1 is a circuit diagram of a buck converter using an ultra-low working current according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a buck converter using an ultra-low working current according to a first embodiment of the present disclosure.

As shown in FIG. 1, the buck converter of the first embodiment of the present disclosure may include a high-side switch UG, a low-side switch LG, an error amplifier ERA, a comparator COM, a control circuit CTR and a driver circuit DRV. If necessary, the buck converter of the present disclosure may further include a voltage divider circuit RDV. It is worth noting that, the buck converter of the present disclosure may further include a low current controller circuit LWC.

A first terminal of the high-side switch UG is connected to an input power source VIN and obtains an input current IQ from the input power source VIN. A second terminal of the high-side switch UG is connected to a first terminal of the low-side switch LG. A second terminal of the low-side switch LG is grounded.

A node between the first terminal of the low-side switch LG and the second terminal of the high-side switch UG is connected to a first terminal of an inductor L. A second terminal of the inductor L is connected to a first terminal of a capacitor C. A second terminal of the capacitor C is grounded. A node between the second terminal of the inductor L and the first terminal of the capacitor C is an output terminal of the buck converter.

A first input terminal such as a non-inverting input terminal of the error amplifier ERA is connected to the node between the second terminal of the inductor L and the first terminal of the capacitor C (through the voltage divider circuit RDV as shown in FIG. 1). A second input terminal such as an inverting input terminal of the error amplifier ERA is coupled to a reference voltage Vref.

For example, as shown in FIG. 1, the voltage divider circuit RDV may include a first resistor R1 and a second resistor R2. A first terminal of the first resistor R1 is connected to the node between the second terminal of the inductor L and the first terminal of the capacitor C. A first terminal of the second resistor R2 is connected to a second terminal of the first resistor R1. A node between the first terminal of the second resistor R2 and the second terminal of the first resistor R1 is connected to the first input terminal such as the non-inverting input terminal of the error amplifier ERA. A second terminal of the second resistor R2 is grounded.

The first input terminal such as the non-inverting input terminal of the error amplifier ERA may receive a voltage of the node between the second terminal of the inductor L and the first terminal of the capacitor C that is an output voltage of the output terminal of the buck converter. Alternatively, the first input terminal such as the non-inverting input terminal of the error amplifier ERA may receive a voltage that is divided from the voltage of the node between the second terminal of the inductor L and the first terminal of the capacitor C that is a divided voltage of the output voltage of the output terminal of the buck converter.

When a first power terminal of the error amplifier ERA obtains the input current IQ from the input power source VIN such that the error amplifier ERA is powered on by the input current IQ, the error amplifier ERA multiplies a difference between the output voltage of the buck converter or the divided voltage thereof and the reference voltage Vref by a gain to output an error amplified signal.

A first input terminal such as an inverting input terminal of the comparator COM is coupled to a ramp voltage Vramp. For example, the first input terminal of the comparator COM may be connected to an external ramp generator and receive a ramp signal from the external ramp generator, wherein a voltage of the ramp signal may be the ramp voltage Vramp. A second power terminal such as a non-inverting input terminal of the comparator COM is connected to an output terminal of the error amplifier ERA.

A first power terminal of the comparator COM may be connected to the input power source VIN.

When the first power terminal of the comparator COM obtains the input current IQ from the input power source VIN such that the comparator COM is powered on by the input current IQ, the comparator COM compares a voltage of the error amplified signal from the output terminal of the error amplifier ERA with the ramp voltage Vramp (of the ramp signal) to output a comparison signal.

The control circuit CTR is connected to an output terminal of the comparator. The control circuit CTR outputs a control signal according to the comparison signal from the output terminal of the comparator COM.

The driver circuit DRV is connected to an output terminal of the control circuit CTR, a control terminal of the high-side switch UG and a control terminal of the low-side switch LG. The driver circuit DRV drives the high-side switch UG and the low-side switch LG according to the control signal from the control circuit CTR.

It is worth noting that, if only an ultra-low current is required for a load (such as a light load) connected to the output terminal of the buck converter, the input current IQ that is obtained from the input power source VIN by the buck converter must be reduced to an ultra-low value such that the buck converter is able to supply the ultra-low current to the load.

Therefore, the buck converter of the present disclosure includes the low current controller circuit LWC. The low current controller circuit LWC is connected to the output terminal of the error amplifier ERA and the control terminal of the comparator COM.

It is worth noting that, the low current controller circuit LWC determines whether or not the buck converter enters the ultra-low current mode according to the error amplified signal from the error amplifier ERA, and accordingly determines how much of the input current IQ is obtained as a working current by the buck converter to output a current mode controlling signal.

It is worth noting that, when the low current controller circuit LWC determines that the buck converter enters the ultra-low current mode according to the error amplified signal from the error amplifier ERA, the low current controller circuit LWC determines that the input current IQ obtained as the working current by the buck converter must be reduced to the ultra-low current.

For example, when the low current controller circuit LWC determines that the voltage of the error amplified signal from the error amplifier ERA is higher than a voltage threshold, the low current controller circuit LWC determines that the buck converter enters the ultra-low current mode, but the present disclosure is not limited thereto.

When the buck converter enters the ultra-low current mode, the comparator COM, according to the current mode controlling signal that is received by the control terminal of the comparator COM from the low current controller circuit LWC, stops obtaining the input current IQ from the input power source VIN and thus the comparator COM is powered down for a period of time, or reduces the input current IQ obtained from input power source VIN for a period of time. Therefore, the input current IQ obtained from the input power source VIN as the working current by the buck converter of the present disclosure is effectively reduced. As a result, an output current supplied to the load by the buck converter of the present disclosure is effectively reduced to the ultra-low current required for the load while power consumption of the buck converter of the present disclosure is reduced.

As shown in FIG. 1, the first power terminal of the error amplifier ERA may be connected to the input power source VIN. In practice, the control terminal of the error amplifier ERA may be connected to the low current controller circuit LWC. When the buck converter enters the ultra-low current mode, the error amplifier ERA, according to the current mode controlling signal that is received by the control terminal of the error amplifier ERA from the low current controller circuit LWC, stops obtaining the input current IQ from the input power source VIN and thus the error amplifier ERA is powered down for a period of time, or reduces the input current IQ obtained from input power source VIN for a period of time. Therefore, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

For the convenience of explanation, an input current obtained from the input power source VIN by each of circuit components of the buck converter of the present disclosure is described as the input current IQ herein. However, it should be understood that, amounts of the input currents that are obtained as the working currents respectively by the circuit components of the buck converter from the input power source VIN for operations may be different from each other.

Figure 2:
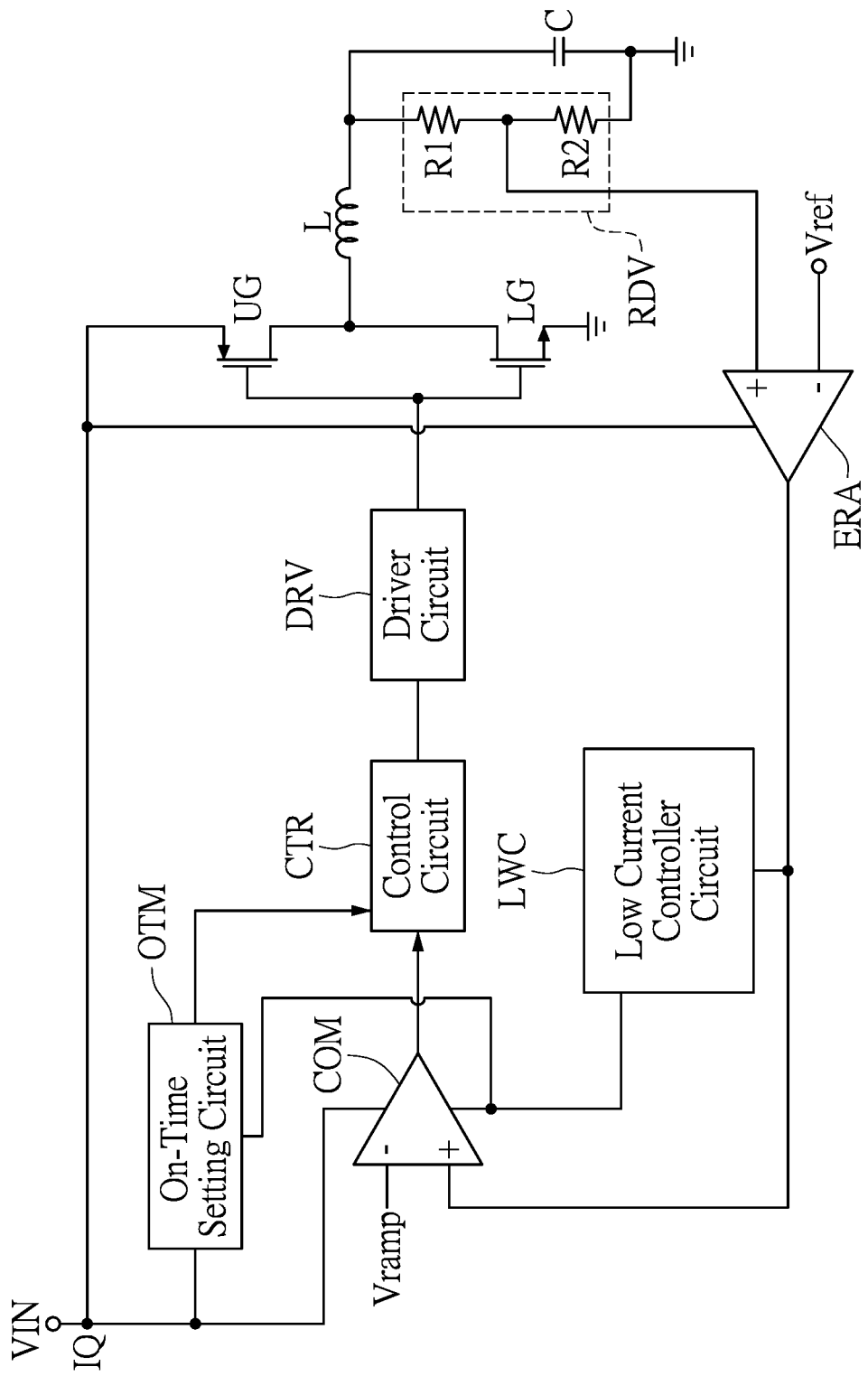
FIG. 2 is a circuit diagram of a buck converter using an ultra-low working current according to a second embodiment of the present disclosure.

Reference is made to FIG. 2, which is a circuit diagram of a buck converter using an ultra-low working current according to a second embodiment of the present disclosure. The same descriptions of the second and first embodiments of the present disclosure are not repeated herein.

A difference between the second and first embodiments of the present disclosure is that, the buck converter of the second embodiment of the present disclosure further includes an on-time setting circuit OTM.

The on-time setting circuit OTM may be connected to the control circuit CTR and the low current controller circuit LWC. The on-time setting circuit OTM may be further connected to the input power source VIN.

When the on-time setting circuit OTM receives the input current IQ from the input power source VIN and is powered on by the input current IQ, the on-time setting circuit OTM outputs an on-time signal.

The control circuit CTR may output the control signal to the driver circuit DRV according to the on-time signal from the on-time setting circuit OTM (and the comparison signal from the comparator COM). The driver circuit DRV drives the high-side switch UG and the low-side switch LG according to the control signal from the control circuit CTR.

It is worth noting that, when the buck converter enters the ultra-low current mode, the on-time setting circuit OTM, according to the current mode controlling signal from the low current controller circuit LWC, stops obtaining the input current IQ from the input power source VIN and thus the on-time setting circuit OTM is powered down for a period of time, or reduces the input current IQ obtained from input power source VIN for a period of time. Therefore, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

That is, when only the ultra-low current supplied by the buck converter is required for the load, the buck converter enters the ultra-low current mode. In the ultra-low current mode, the comparator COM, the on-time setting circuit OTM and the other circuit components of the buck converter stop obtaining the input current IQ from the input power source VIN and thus are powered down for a period of time, or reduce the input current IQ obtained from input power source VIN for a period of time. Therefore, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

Figure 3:
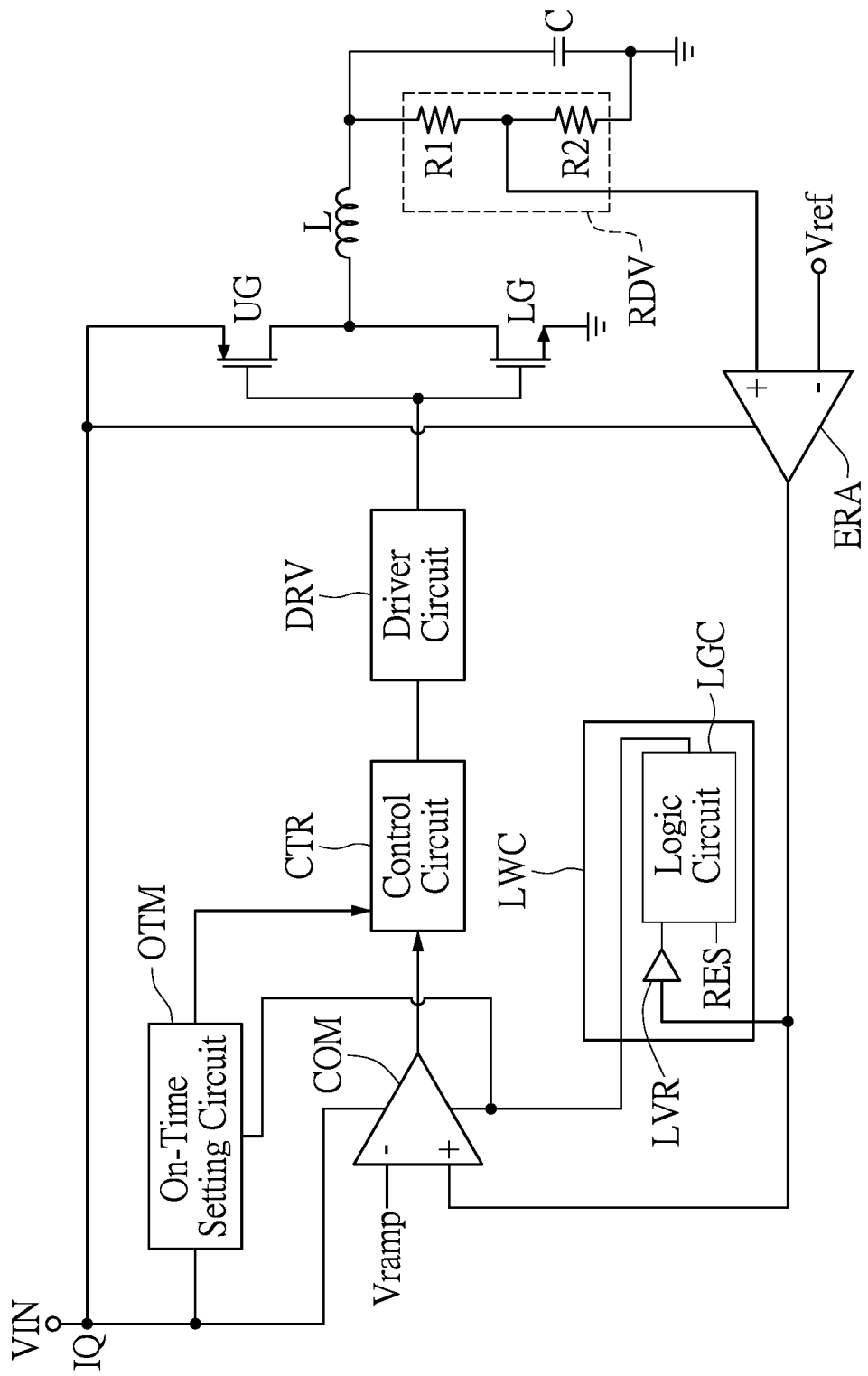
FIG. 3 is a circuit diagram of a buck converter using an ultra-low working current according to a third embodiment of the present disclosure.
Figure 4:
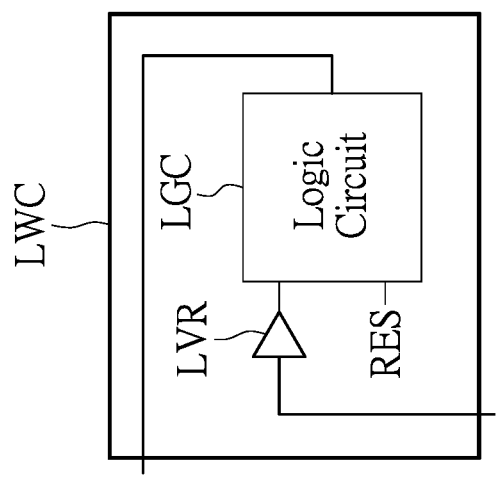
FIG. 4 is a circuit diagram of a low current controller circuit of the buck converter using the ultra-low working current according to the third embodiment of the present disclosure.

Reference is made to FIGS. 3 and 4, in which FIG. 3 is a circuit diagram of a buck converter using an ultra-low working current according to a third embodiment of the present disclosure, and FIG. 4 is a circuit diagram of a low current controller circuit of the buck converter using the ultra-low working current according to the third embodiment of the present disclosure.

The same descriptions of the first to third embodiments of the present disclosure are not repeated herein.

For example, in the third embodiment of the present disclosure, the low current controller circuit LWC may include a buffer LVR and a logic circuit LGC as shown in FIGS. 3 and 4, but the present disclosure is not limited thereto. In practice, the buffer LVR may be replaced with an inverter, and the logic circuit LGC may be an SR flip-flop or other logic components.

An input terminal of the buffer LVR is connected to the output terminal of the error amplifier ERA. A first input terminal of the logic circuit LGC (such as a terminal S of the SR flip-flop) is connected to an output terminal of the buffer LVR. A second input terminal of the logic circuit LGC (such as a terminal R of the SR flip-flop) is connected to an external reset circuit and receives a reset signal RES from the external reset circuit. An output terminal of the logic circuit LGC may be connected to the control terminal of the comparator COM, the on-time setting circuit OTM and the other circuit components of the buck converter of the present disclosure.

The buffer LVR (that may be replaced by the inverter) outputs a logic signal according to the error amplified signal from the error amplifier ERA.

When only the ultra-low current is required for the load, the buck converter of the present disclosure enters the ultra-low current mode. In the ultra-low current mode, the logic circuit LGC generates the current mode controlling signal according to the logic signal from the buffer LVR (that may be replaced by the inverter) and the reset signal RES from the external reset circuit.

In the ultra-low current mode, the logic circuit LGC outputs the current mode controlling signal to the control terminal of the comparator COM, the on-time setting circuit OTM and the other circuit components of the buck converter of the present disclosure. As a result, the comparator COM, the on-time setting circuit OTM and the other circuit components of the buck converter of the present disclosure, according to the current mode controlling signal, stop obtaining the input current IQ from the input power source VIN or reduce the input current IQ obtained from the input power source VIN.

When the buck converter of the present disclosure has entered the ultra-low current mode for period of times or the current required for the load increases, the circuit components of the buck converter may be restarted and resume normally obtaining the input current IQ from the input power source VIN according to the current mode controlling signal from the logic circuit LGC. Under this condition, the circuit components of the buck converter of the present disclosure may resume performing their respective operations.

Figure 5:
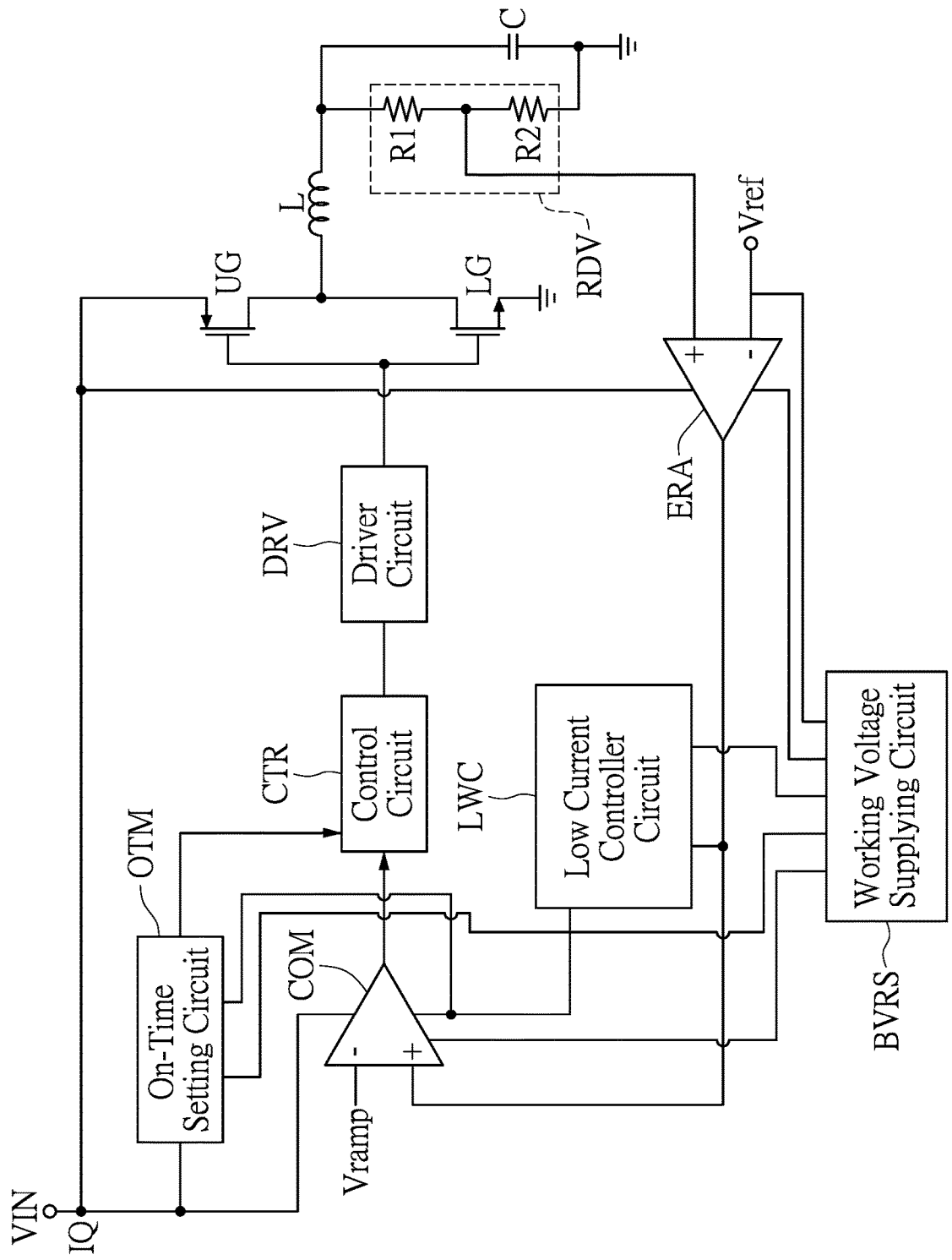
FIG. 5 is a circuit diagram of a buck converter using an ultra-low working current according to a fourth embodiment of the present disclosure.

Reference is made to FIG. 5, which is a circuit diagram of a buck converter using an ultra-low working current according to a fourth embodiment of the present disclosure. The same descriptions of the first and fourth embodiments of the present disclosure are not repeated herein.

A difference between the fourth and first embodiments of the present disclosure is that, the buck converter of the fourth embodiment of the present disclosure is further connected to a working voltage supplying circuit BVRS.

The working voltage supplying circuit BVRS may be connected to the circuit components of the buck converter of the present disclosure such as the comparator COM, the on-time setting circuit OTM and the error amplifier ERA that need to obtain the reference voltage Vref or bias voltages from the working voltage supplying circuit BVRS. In addition, the working voltage supplying circuit BVRS is connected to the low current controller circuit LWC.

The working voltage supplying circuit BVRS may, according to the current mode controlling signal from the low current controller circuit LWC, determines whether or not the buck converter enters the ultra-low current mode, and accordingly determines whether or not the working voltage supplying circuit BVRS stops obtaining the input current IQ from the input power source VIN and thus is powered down for a period of time or reduces the input current IQ obtained from the input power source VIN.

The working voltage supplying circuit BVRS may, according to the current mode controlling signal from the low current controller circuit LWC, determines whether or not the buck converter enters the ultra-low current mode and accordingly determines whether or not the working voltage supplying circuit BVR supplies the reference voltage Vref and the bias voltages to the buck converter.

When the buck converter does not enter the ultra-low current mode, the working voltage supplying circuit BVRS normally obtains the input current IQ from the input power source VIN for operation. At this time, the working voltage supplying circuit BVRS may normally supply the reference voltage Vref to the second input terminal such as the inverting input terminal of the error amplifier ERA. The working voltage supplying circuit BVRS may normally supply the bias voltages respectively to a second power terminal of the comparator COM, the on-time setting circuit OTM, a second power terminal of the error amplifier ERA and the other circuit components of the buck converter of the present disclosure.

It is worth noting that, when the buck converter enters the ultra-low current mode, the working voltage supplying circuit BVRS stops obtaining the input current IQ from the input power source VIN and thus is powered down or reduces the input current IQ obtained from the input power source VIN. In the ultra-low current mode, the working voltage supplying circuit BVRS may stop supplying the reference voltage Vref and the bias voltages to the buck converter of the present disclosure. As a result, the comparator COM, the on-time setting circuit OTM, the error amplifier ERA and the other circuit components of the buck converter of the present disclosure do not obtain the reference voltage Vref and the bias voltages (as working voltages) respectively, and thus stop performing operations and obtaining the input current IQ from the input power source VIN.

Therefore, in the ultra-low current mode, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

Figure 6:
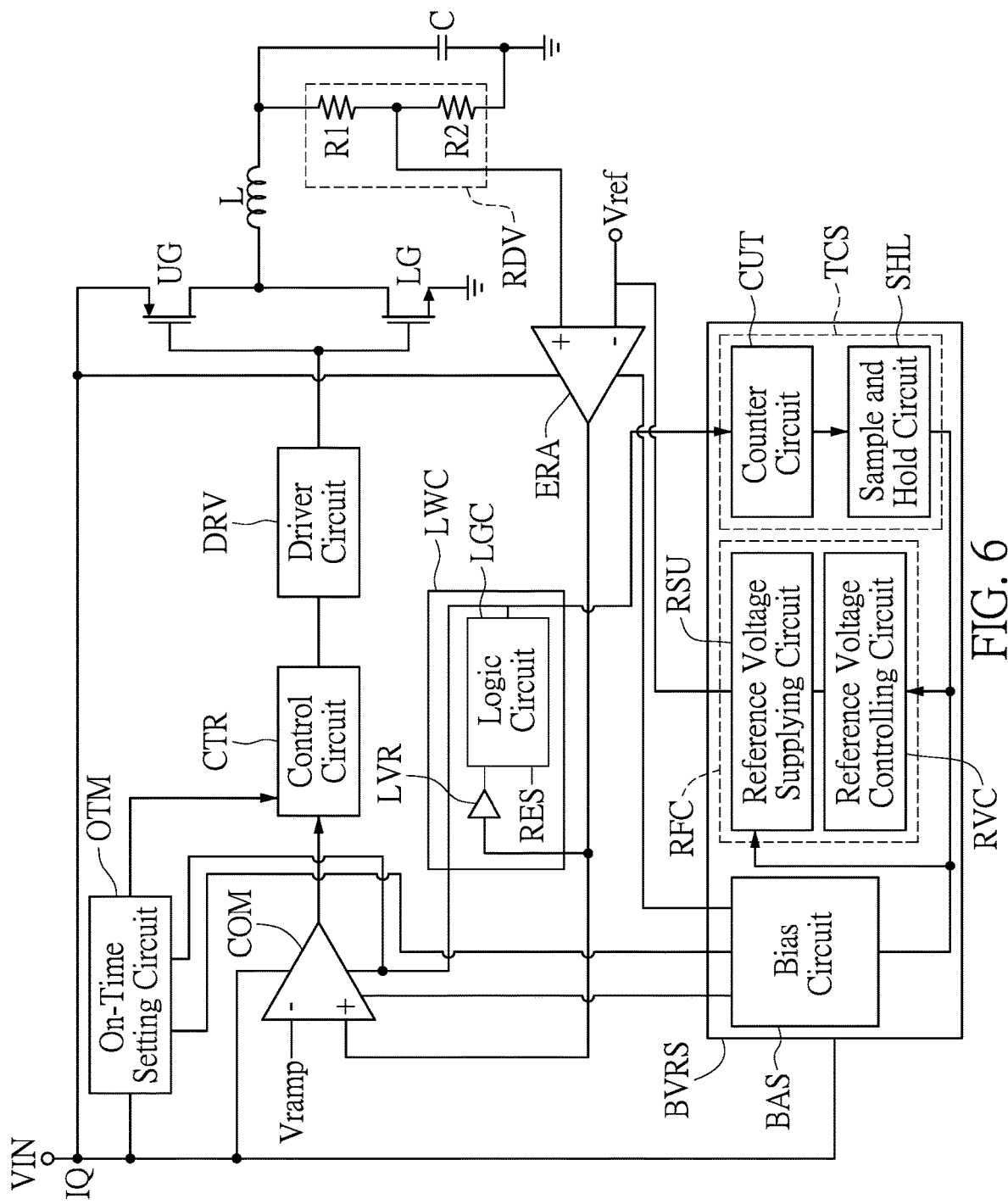
FIG. 6 is a circuit diagram of a buck converter using an ultra-low working current according to a fifth embodiment of the present disclosure.
Figure 7:
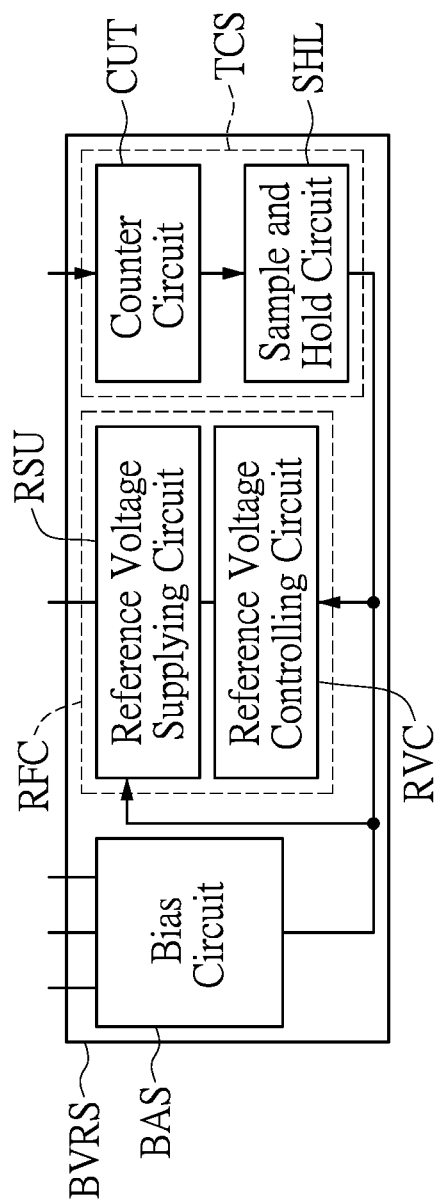
FIG. 7 is a circuit diagram of a working voltage supplying circuit of the buck converter using the ultra-low working current according to the fifth embodiment of the present disclosure.

Reference is made to FIGS. 6 and 7, in which FIG. 6 is a circuit diagram of a buck converter using an ultra-low working current according to a fifth embodiment of the present disclosure, and FIG. 7 is a circuit diagram of a working voltage supplying circuit of the buck converter using the ultra-low working current according to the fifth embodiment of the present disclosure.

For example, in the fifth embodiment of the present disclosure as shown in FIGS. 6 and 7, the working voltage supplying circuit BVRS includes a bias circuit BAS, a reference voltage circuit RFC and a current mode determining circuit TCS. The current mode determining circuit TCS is connected to the reference voltage circuit RFC, the bias circuit BAS and the low current controller circuit LWC.

For example, as shown in FIGS. 6 and 7, the current mode determining circuit TCS may include a counter circuit CUT and a sample and hold circuit SHL, and the reference voltage circuit RFC may include a reference voltage supplying circuit RSU and a reference voltage controlling circuit RVC.

The counter circuit CUT of the current mode determining circuit TCS may count for outputting a count signal according to (levels of) the current mode controlling signal from the low current controller circuit LWC.

The sample and hold circuit SHL of the current mode determining circuit TCS may output the current mode sampling signal according to the count signal from the counter circuit CUT.

When the reference voltage controlling circuit RVC determines that the buck converter does not enter the ultra-low current mode according to the current mode sampling signal from the sample and hold circuit SHL of the current mode determining circuit TCS, the reference voltage controlling circuit RVC may obtain the input current IQ from the input power source VIN and control the reference voltage supplying circuit RSU to obtain the input current IQ from the input power source VIN.

When the buck converter does not enter the ultra-low current mode, the reference voltage controlling circuit RVC may control the reference voltage supplying circuit RSU to supply the reference voltage Vref to the second input terminal such as the inverting input terminal of the error amplifier ERA (and the other circuit components of the buck converter of the present disclosure).

It is worth noting that, when the reference voltage controlling circuit RVC determines that the buck converter enters the ultra-low current mode according to the current mode sampling signal from the sample and hold circuit SHL of the current mode determining circuit TCS, the reference voltage controlling circuit RVC stops obtaining the input current IQ from the input power source VIN and thus is powered down for a period of time or reduces the input current IQ obtained from the input power source VIN.

It is worth noting that, in the ultra-low current mode, the reference voltage controlling circuit RVC may control the reference voltage supplying circuit RSU to stop obtaining the input current IQ from the input power source VIN and thus is powered down for a period of time or to reduce the input current IQ obtained from the input power source VIN.

In addition, in the ultra-low current mode, the reference voltage controlling circuit RVC may control the reference voltage supplying circuit RSU to stop supplying the reference voltage Vref to the second input terminal such as the inverting input terminal of the error amplifier ERA (and the other circuit components of the buck converter of the present disclosure). As a result, the error amplifier ERA (and the other circuit components of the buck converter of the present disclosure) does not obtain the reference voltage Vref (as the working voltage) for operation, and thus stops operating. At this time, the error amplifier ERA stops obtaining the input current IQ from the input power source VIN.

Therefore, in the ultra-low current mode, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

On the other hand, when the bias circuit BAS determines that the buck converter does not enter the ultra-low current mode according to the current mode sampling signal from the sample and hold circuit SHL of the current mode determining circuit TCS, the bias circuit BAS may obtain the input current IQ from the input power source VIN.

When the buck converter does not enter the ultra-low current mode, the bias circuit BAS may normally supply the bias voltages respectively to the second power terminal of the comparator COM, the on-time setting circuit OTM, the second power terminal of the error amplifier ERA and the other circuit components of the buck converter of the present disclosure.

It is worth noting that, when the bias circuit BAS determines that the buck converter enters the ultra-low current mode according to the current mode sampling signal from the sample and hold circuit SHL of the current mode determining circuit TCS, the bias circuit BAS stops obtaining the input current IQ from the input power source VIN and thus is powered down for a period of time or reduces the input current IQ obtained from the input power source VIN.

In the ultra-low current mode, the bias circuit BAS does not supply the bias voltages. As a result, the comparator COM, the on-time setting circuit OTM, the error amplifier ERA and the other circuit components of the buck converter of the present disclosure do not obtain the bias voltages (as working voltages) for operation, and thus stop performing operations and obtaining the input current IQ from the input power source VIN.

Therefore, the input current IQ obtained from the input power source VIN as the working current by the buck converter of the present disclosure is effectively reduced. As a result, the output current supplied to the load by the buck converter of the present disclosure is effectively reduced to the ultra-low current required for the load while the power consumption of the buck converter of the present disclosure is reduced.

In conclusion, the present disclosure provides the buck converter using the ultra-low working current. When only the ultra-low current is required for the load, some of the circuit components of the buck converter of the present disclosure stop obtaining the input current from the input power source as the working current or reduce the input current obtained from the input power source such that the working current of the buck converter of the present disclosure is reduced to the ultra-low value. Therefore, the output current supplied to the load by the buck converter of the present disclosure is effectively reduced to the ultra-low current required for the load while the power consumption of the buck converter of the present disclosure is reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A buck converter using an ultra-low working current, comprising:
   a high-side switch, wherein a first terminal of the high-side switch is connected to an input power source and obtains an input current from the input power source;
   a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of a capacitor, and a second terminal of the capacitor is grounded;
   an error amplifier, wherein a first input terminal of the error amplifier is connected to a node between the second terminal of the inductor and the first terminal of the capacitor, and a second input terminal of the error amplifier is coupled to a reference voltage;
   a comparator, wherein a first input terminal of the comparator is coupled to a ramp voltage, a second input terminal of the comparator is connected to an output terminal of the error amplifier, a first power terminal of the comparator is connected to the input power source, and the first power terminal of the comparator obtains the input current from the input power source when the buck converter does not enter an ultra-low current mode;
   a control circuit connected to an output terminal of the comparator, and configured to output a control signal according to a comparison signal outputted by the comparator;
   a driver circuit connected to an output terminal of the control circuit, a control terminal of the high-side switch and a control terminal of the low-side switch, and configured to drive the high-side switch and the low-side switch according to the control signal; and
   a low current controller circuit connected to the output terminal of the error amplifier and a control terminal of the comparator, and configured to output a current mode controlling signal to the control terminal of the comparator according to an error amplified signal outputted by the error amplifier;
   wherein, when the buck converter enters the ultra-low current mode, the comparator stops obtaining the input current from the input power source or reduces the input current obtained from the input power source according to the current mode controlling signal from the low current controller circuit;
   wherein the low current controller circuit is connected to a working voltage supplying circuit and a first power terminal of the error amplifier is connected to the input power source, and when the working voltage supplying determines that the buck converter enters the ultra-low current mode according to the current mode controlling signal, the working voltage supplying circuit does not supply a bias voltage to a second power terminal of the error amplifier.

2. The buck converter according to claim 1, wherein the first power terminal of the error amplifier obtains the input current from the input power source when the buck converter does not enter the ultra-low current mode.

3. The buck converter according to claim 1, further comprising:
   a voltage divider circuit including:
      a first resistor, wherein a first terminal of the first resistor is connected to the node between the second terminal of the inductor and the first terminal of the capacitor; and
      a second resistor, wherein a first terminal of the second resistor is connected to a second terminal of the first resistor and the first input terminal of the error amplifier, and a second terminal of the second resistor is grounded.

4. The buck converter according to claim 1, wherein the low current controller circuit includes:
   a buffer, wherein an input terminal of the buffer is connected to the output terminal of the error amplifier; and
   a logic circuit, wherein a first input terminal of the logic circuit is connected to an output terminal of the buffer, a second input terminal of the logic circuit receives a rest signal, an output terminal of the logic circuit is connected to the control terminal of the comparator, and the logic circuit outputs the current mode controlling signal according to the error amplified signal and the rest signal.

5. The buck converter according to claim 1, wherein, when the working voltage supplying circuit determines that the buck converter enters the ultra-low current mode according to the current mode controlling signal from the low current controller circuit, the working voltage supplying circuit does not supply the reference voltage to the second input terminal of the error amplifier.

6. The buck converter according to claim 5, wherein, when the working voltage supplying circuit determines that the buck converter enters the ultra-low current mode according to the current mode controlling signal, the working voltage supplying circuit does not supply the bias voltage to a second power terminal of the comparator.

7. The buck converter according to claim 1, wherein the low current controller circuit is connected to a current mode determining circuit, and the current mode determining circuit outputs a current mode sampling signal according to the current mode controlling signal from the low current controller circuit.

8. The buck converter according to claim 7, wherein the current mode determining circuit includes:
   a counter circuit connected to the low current controller circuit and being configured to count for outputting a count signal according to the current mode controlling signal from the low current controller circuit; and
   a sample and hold circuit connected to the counter circuit and being configured to sample and hold the count signal for outputting the current mode sampling signal.

9. The buck converter according to claim 8, wherein the current mode determining circuit is connected to a reference voltage circuit, and the reference voltage circuit is connected to the second input terminal of the error amplifier and the input power source;
  wherein, when the reference voltage circuit determines that the buck converter does not enter the ultra-low current mode according to the current mode sampling signal, the reference voltage circuit obtains the input current from the input power source and supplies the reference voltage to the second input terminal of the error amplifier.

10. The buck converter according to claim 9, wherein, when the reference voltage circuit determines that the buck converter enters the ultra-low current mode according to the current mode sampling signal, the reference voltage circuit does not obtain the input current and does not supply the reference voltage.

11. The buck converter according to claim 10, wherein the reference voltage circuit includes:
  a reference voltage supplying circuit connected to the second input terminal of the error amplifier and the input power source; and
  a reference voltage controlling circuit connected to the current mode determining circuit and the reference voltage supplying circuit, wherein the reference voltage controlling circuit determines whether or not the buck converter enters the ultra-low current mode according to the current mode sampling signal, and accordingly determines whether the reference voltage controlling circuit controls the reference voltage supplying circuit to obtain the input current from the input power source and to supply the reference voltage to the second input terminal of the error amplifier.

12. The buck converter according to claim 8, wherein the current mode determining circuit is connected to a bias circuit, and the bias circuit is connected to the input power source and a second power terminal of the comparator;
  wherein, when the bias circuit determines that the buck converter does not enter the ultra-low current mode according to the current mode sampling signal, the bias circuit obtains the input current from the input power source and supplies the bias voltage to the second power terminal of the comparator;
  wherein, when the bias circuit determines that the buck converter enters the ultra-low current mode according to the current mode sampling signal, the bias circuit does not obtain the input current from the input power source.

13. The buck converter according to claim 12, wherein, when the bias circuit determines that the buck converter enters the ultra-low current mode according to the current mode sampling signal, the bias circuit does not supply the bias voltage to the second power terminal of the comparator.

14. The buck converter according to claim 12, wherein the bias circuit is further connected to the second power terminal of the error amplifier, and when the bias circuit determines that the buck converter does not enter the ultra-low current mode according to the current mode sampling signal, the bias circuit obtains the input current from the input power source and supplies the bias voltage to the second power terminal of the error amplifier.

15. The buck converter according to claim 14, wherein, when the bias circuit determines that the buck converter enters the ultra-low current mode according to the current mode sampling signal, the bias circuit does not supply the bias voltage to the second power terminal of the error amplifier.

16. The buck converter according to claim 12, further comprising:
  an on-time setting circuit connected to the bias circuit, and when the bias circuit determines that the buck converter does not enter the ultra-low current mode according to the current mode sampling signal, the bias circuit supplies the bias voltage to the on-time setting circuit.

17. The buck converter according to claim 16, wherein, when the bias circuit determines that the buck converter enters the ultra-low current mode according to the current mode sampling signal, the bias circuit does not supply the bias voltage to the on-time setting circuit.

18. The buck converter according to claim 1, further comprising:
  an on-time setting circuit connected to the control circuit, the low current controller circuit and the input power source;
  wherein, when the on-time setting circuit determines that the buck converter does not enter the ultra-low current mode according to the current mode controlling signal from the low current controller circuit, the on-time setting circuit obtains the input current from the input power source and outputs an on-time signal to the control circuit, and the control circuit outputs the control signal according to both of the on-time signal and the comparison signal.

19. The buck converter according to claim 18, wherein, when the on-time setting circuit determines that the buck converter enters the ultra-low current mode according to the current mode controlling signal, the on-time setting circuit does not obtain the input current from the input power source.

* * * * *